United States Patent
Hirose et al.

(10) Patent No.: US 7,786,385 B2
(45) Date of Patent: Aug. 31, 2010

(54) SUPERCONDUCTING CABLE LINE

(76) Inventors: Masayuki Hirose, c/o Osaka Works of Sumitomo Electric Industries, 1-3, Shimaya 1-chome, Konohana-ku, Osaka-shi, Osaka (JP) 554-8511; Yuichi Yamada, c/o Osaka Works of Sumitomo Electric Industries, 1-3, Shimaya 1-chome, Konohana-ku, Osaka-shi, Osaka (JP) 554-8511

( * ) Notice: Subject to any disclaimer, the term of this patent is extended or adjusted under 35 U.S.C. 154(b) by 724 days.

(21) Appl. No.: 11/630,910

(22) PCT Filed: Jul. 12, 2005

(86) PCT No.: PCT/JP2005/012822

§ 371 (c)(1),
(2), (4) Date: Dec. 27, 2006

(87) PCT Pub. No.: WO2006/011358

PCT Pub. Date: Feb. 2, 2006

(65) Prior Publication Data

US 2009/0170706 A1     Jul. 2, 2009

(30) Foreign Application Priority Data

Jul. 29, 2004  (JP) .............................. 2004-222529
Mar. 14, 2005  (JP) .............................. 2005-072050

(51) Int. Cl.
  *H01B 12/00*  (2006.01)
(52) U.S. Cl. .................... 174/125.1; 174/15.4; 505/230
(58) Field of Classification Search ................ 174/15.4, 174/15.5, 125.1; 505/230–232
  See application file for complete search history.

(56) References Cited

U.S. PATENT DOCUMENTS 6,049,036 A * 4/2000 Metra .......................... 174/15.5

FOREIGN PATENT DOCUMENTS

| GB | 1400652 | 7/1975 |
| JP | 10-092627 | 4/1998 |
| JP | 2002-130851 | 5/2002 |

(Continued)

OTHER PUBLICATIONS

English translation of Decision to Grant dated Jan. 16, 2009 for related Russian patent application 2007107385/09/(008029).

(Continued)

*Primary Examiner*—Jeremy C Norris
(74) *Attorney, Agent, or Firm*—Foley & Lardner LLP (57) ABSTRACT

A superconducting cable line includes a heat insulation pipe for a fluid for transporting a fluid having a temperature lower than an ordinary temperature and a superconducting cable housed in the heat insulation pipe for a fluid. The superconducting cable including a cable core in a heat insulation pipe for a cable is housed in the heat insulation pipe for a fluid to make a temperature difference between the inside and outside of the heat insulation pipe smaller than that in a situation of laying in an atmosphere. In addition, the superconducting cable has a double heat insulation structure formed with the heat insulation pipe for a cable and the heat insulation pipe for a fluid. Therefore, the superconducting cable line can effectively reduce heat intrusion from the outside into the cable.

10 Claims, 6 Drawing Sheets

FOREIGN PATENT DOCUMENTS

| | | |
|---|---|---|
| JP | 2002-352645 A | 12/2002 |
| JP | 2005-90636 A | 4/2005 |
| JP | 2005-122991 A | 5/2005 |
| SU | 527411 | 9/1976 |
| SU | 631091 | 10/1978 |

OTHER PUBLICATIONS

English translation of Office Action dated Aug. 1, 2008 for related Russian Patent Application No. 2007107385/09/(008029).

Japanese Patent Office, International search report, PCT/JP2005/012822, Japan. mailing date Sep. 16, 2005.

* cited by examiner

SUPERCONDUCTING CABLE LINE

TECHNICAL FIELD

The present invention relates to a line for power supply including a superconducting cable. More specifically, the present invention relates to a superconducting cable line which effectively decreases heat intrusion into a superconducting cable and can increase a coefficient of performance (COP).

BACKGROUND ART

Figure 11:
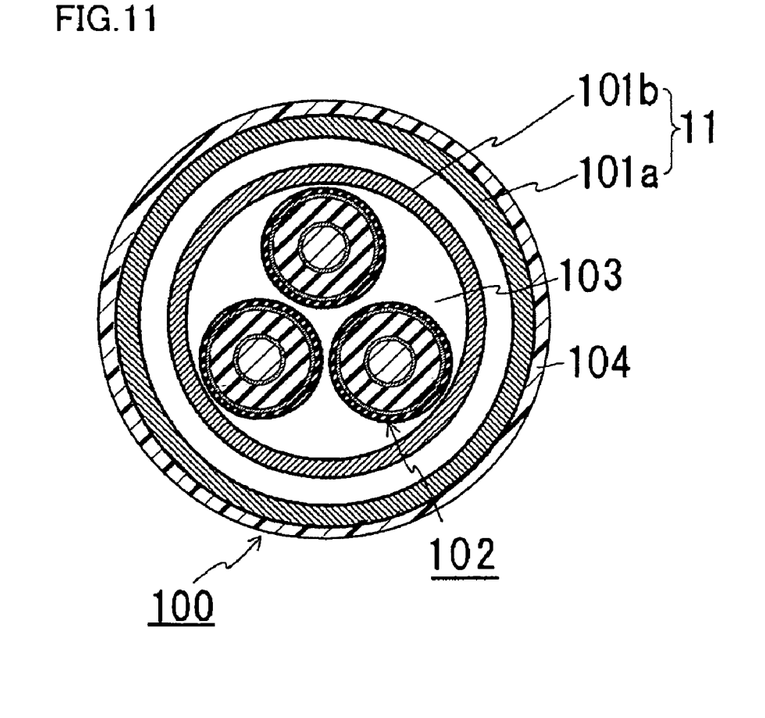
FIG. 11 is a cross-sectional view of a three-core type superconducting cable for three-phase AC transmission.
Figure 12:
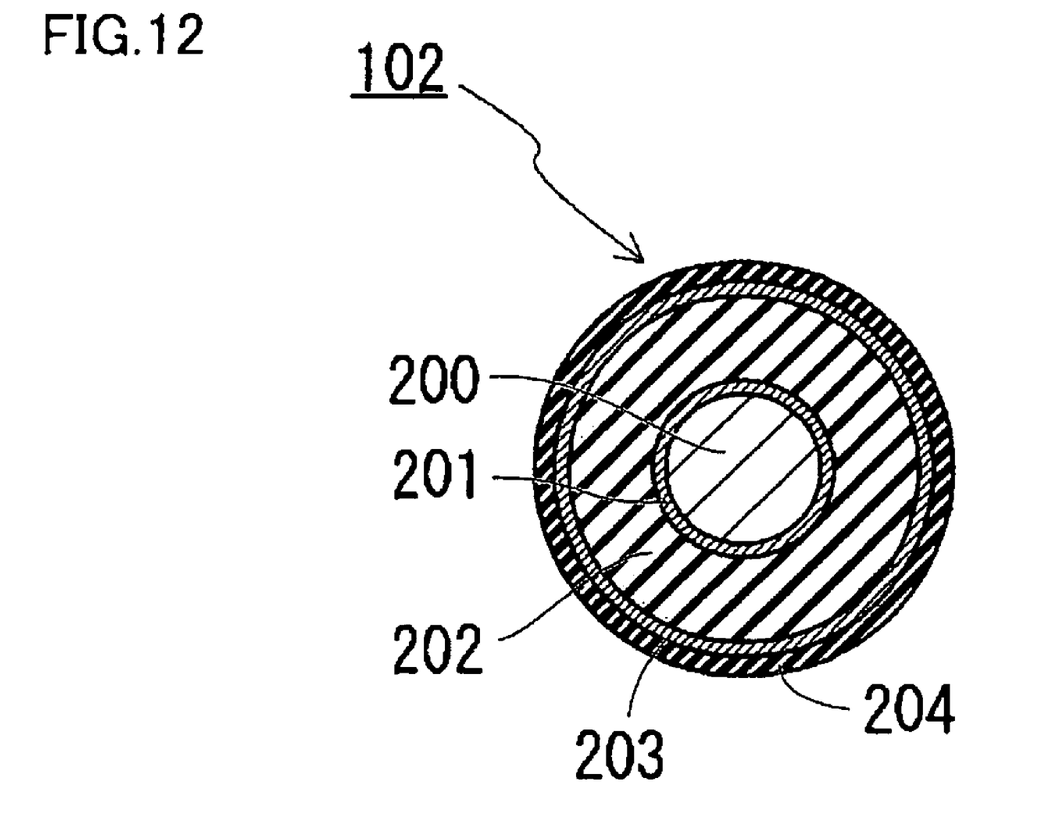
FIG. 12 is a cross-sectional view of each cable core 102.

A superconducting cable including a heat insulation pipe housing a cable core having a superconducting conductor layer has been conventionally known. Such a superconducting cable includes, for example, a single-core cable having a heat insulation pipe housing one cable core or a three-core cable housing three cable cores in a bundle. FIG. 11 is a cross-sectional view of a three-core superconducting cable for three-phase AC transmission. FIG. 12 is a cross-sectional view of each cable core 102. This superconducting cable 100 has a construction in which three stranded cable cores 102 are housed in a heat insulation pipe 101. Heat insulation pipe 101 has a construction in which a heat insulating material (not shown) is arranged between a double pipe formed with an external pipe 101a and an internal pipe 101b, and air between the pipes 101a, 101b is evacuated. Each cable core 102 includes, from a center portion thereof, a former 200, a superconducting conductor layer 201, an electrical insulation layer 202, a superconducting shield layer 203, and a protection layer 204. Space 103 enclosed with internal pipe 101b and each cable core 102 becomes a passage of a refrigerant such as liquid nitrogen. A superconducting state of superconducting conductor layer 201 and superconducting shield layer 203 of cable core 102 is maintained by cooling with the refrigerant. A corrosion-proof layer 104 is included on an outer periphery of heat insulation pipe 101.

The superconducting cable must be continuously cooled with the refrigerant such as liquid nitrogen to maintain the superconducting state of the superconducting conductor layer and the superconducting shield layer. Therefore, a line using the superconducting cable usually includes a cooling system for a refrigerant. With this system, circulation cooling is performed in which the refrigerant ejected from the cable is cooled and allowed to flow into the cable again.

With cooling of the refrigerant to an appropriate temperature by the cooling system, the superconducting cable can maintain the superconducting state of the superconducting conductor layer and the superconducting shield layer by sufficiently decreasing an increase in a temperature of the refrigerant due to heat generated by passage of a current or heat intrusion from the outside such as an atmosphere. When the refrigerant is liquid nitrogen, however, energy required for cooling the refrigerant to address such generated heat or heat intrusion becomes at least 10 times higher than energy handled by the refrigerant to cool the cable. Therefore, when the superconducting cable line including the cooling system for the refrigerant is considered as a whole, a coefficient of performance (COP) becomes about 0.1 or lower. Such a low COP is one of causes of a decreased application effect of a superconducting cable. On the other hand, each of Japanese Patent Laying-Open No. 2002-130851 (Patent Document 1) and Japanese Patent Laying-Open No. 10-092627 (Patent Document 2) proposes to cool a refrigerant of a superconducting coil utilizing cold heat of a liquefied natural gas (an LNG).

Patent Document 1: Japanese Patent Laying-Open No. 2002-130851
Patent Document 2: Japanese Patent Laying-Open No. 10-092627

DISCLOSURE OF THE INVENTION

Problems to be Solved by the Invention

Each of Patent Documents 1 and 2 described above merely discloses utilization of cold heat of an LNG for cooling a refrigerant of a superconducting coil, and does not consider as to reduction of heat intrusion from the outside.

Therefore, a main object of the present invention is to provide a superconducting cable line which can reduce heat intrusion from the outside and increase a coefficient of performance.

Means for Solving the Problems

The present invention attains the above-described object by arranging a superconducting cable in a heat insulation pipe transporting a fluid of a low temperature. That is, a superconducting cable line of the present invention includes a heat insulation pipe for a fluid (a first heat insulation pipe) for transporting a fluid having a temperature lower than an ordinary temperature, and a superconducting cable housed in the heat insulation pipe for a fluid (the first heat insulation pipe). The present invention will be described in a more detail in the following.

The superconducting cable utilized in the present invention has a construction including a superconducting portion formed with a superconducting material and a heat insulation pipe (hereafter referred to as a heat insulation pipe for a cable) housing the superconducting portion and filled with a refrigerant for cooling the superconducting portion. The superconducting portion may include a superconducting conductor layer for passing a current for power supply and an external superconducting layer for passing a current having substantially the same value as that for the superconducting conductor layer in an opposite direction. The superconducting portion is generally formed in a cable core. Therefore, the superconducting cable may be constructed by housing the cable core including the superconducting layer in the heat insulation pipe for a cable. A more specific construction of the cable core may include, from a center portion thereof, a former, a superconducting conductor layer, an electrical insulation layer, an external superconducting layer, and a protection layer. The heat insulation pipe for a cable may house one cable core (a single core (one core)) or a plurality of cable cores (a plurality of cores). More specifically, when the line of the present invention is used for three-phase AC transmission, for example, a three-core cable having the heat insulation pipe for a cable housing three stranded cores may be utilized, and when the line of the present invention is used for single-phase AC transmission, a single-core cable having the heat insulation pipe for a cable housing one core may be utilized. When the line of the present invention is used for DC transmission (monopolar transmission), for example, a single-core cable having the heat insulation pipe for a cable housing one core may be utilized, and when the line of the present invention is used for DC transmission (bipolar transmission), a two-core cable or a three-core cable having the heat insulation pipe for a cable housing two or three stranded cores may be utilized. As described above, the superconducting cable line of the present invention can be utilized for either of the DC transmission and the AC transmission.

The superconducting conductor layer may be formed by, for example, spirally winding a tape-like wire including a plurality of filaments made of a Bi-based oxide superconducting material, more specifically, a Bi2223-based superconducting material which are arranged in a matrix such as a silver sheath. The superconducting conductor layer may have a single-layer or multilayer structure. When the superconducting conductor layer has a multilayer structure, an interlayer insulation layer may be provided therein. The interlayer insulation layer may be provided by winding insulating paper such as kraft paper or semisynthetic insulating paper such as PPLP (a trademark of Sumitomo Electric Industries, Ltd.). The superconducting conductor layer is formed by winding a wire made of the superconducting material around the former. The former may be a solid or hollow body formed with a metal material such as copper or aluminum, and may have a construction of, for example, a plurality of stranded copper wires. A copper wire having insulating coating may be utilized. The former functions as a shape-maintaining member of the superconducting conductor layer. A cushion layer may be interposed between the former and the superconducting conductor layer. The cushion layer avoids direct contact of metals between the former and a superconducting wire to prevent the superconducting wire from being damaged. In particular, when the former has a stranded structure, the cushion layer also has a function to smooth a surface of the former. Insulating paper or carbon paper can be suitably utilized as a specific material of the cushion layer.

The electrical insulation layer may be formed by winding semisynthetic insulating paper such as PPLP (trademark) or insulating paper such as kraft paper on the superconducting conductor layer. A semi-conducting layer may be formed with carbon paper or the like on at least one of an inner periphery and an outer periphery of the electrical insulation layer, that is, between the superconducting conductor layer and the electrical insulation layer and between the electrical insulation layer and the external superconducting layer (described below). With formation of an internal semi-conducting layer, the former, or an external semi-conducting layer, the latter, adhesion between the superconducting conductor layer and the electrical insulation layer or between the electrical insulation layer and the external superconducting layer is increased to suppress deterioration due to an occurrence of partial discharge or the like.

When the line of the present invention is used for DC transmission, the electrical insulation layer may be subjected to $\rho$ grading for attaining a low resistivity on an inner periphery side of the electrical insulation layer and a high resistivity on an outer periphery side to smooth a DC electric field distribution in a diameter direction (a thickness direction) thereof. As described above, "$\rho$ grading" means varying of a resistivity in the thickness direction of the electrical insulation layer in a stepwise manner, which can smooth the DC electric field distribution in a whole thickness direction of the electrical insulation layer and can decrease a thickness of the electrical insulation layer. Though a number of layers having varied resistivities is not specifically limited, two or three layers are practical. In particular, smoothing of the DC electric field distribution can be performed more effectively when a thickness of each layer is equalized.

The $\rho$ grading may be performed using insulating materials having resistivities ($\rho$) different from each other. When insulating paper such as kraft paper is utilized, for example, a resistivity can be varied by varying a density of the kraft paper or adding dicyandiamide to the kraft paper. When composite paper formed with insulating paper and a plastic film such as PPLP (trademark) is utilized, a resistivity can be varied by varying a ratio $k=(tp/T)\times100$, a ratio of a thickness tp of the plastic film to a thickness T of whole composite paper, or by varying a density, a material, an additive or the like of the insulating paper. A value of ratio k is preferably within a range of, for example, about 40-90%. Generally, resistivity $\rho$ becomes higher as ratio k increases.

Furthermore, when the electrical insulation layer has a high $\epsilon$ layer provided near the superconducting conductor layer and having a permittivity higher than that in another portion, an Imp. withstand voltage property can be increased in addition to an increase in a DC withstand voltage property. A permittivity $\epsilon(20°C.)$ is about 3.2-4.5 in general kraft paper, about 2.8 in composite paper having ratio k of 40%, about 2.6 in composite paper having the ratio of 60%, and about 2.4 in composite paper having the ratio of 80%. The electrical insulation layer constructed with composite paper using kraft paper having high ratio k and higher airtightness is especially preferable because both of a DC withstand voltage and an Imp. withstand voltage are increased.

A cable also suitable for AC transmission is formed by constructing the electrical insulation layer to have permittivity $\epsilon$ increased toward the inner periphery side and decreased toward the outer periphery side, in addition to the $\rho$ grading described above. This "$\epsilon$ grading" is also performed over a whole region in the diameter direction of the electrical insulation layer. In addition, the superconducting cable subjected to the $\rho$ grading described above has good DC characteristics and can be suitably utilized as a DC transmission line. On the other hand, most of current transmission lines are constructed for AC transmission. When a transmission system is shifted from an AC system to a DC system, a situation may occur in which an AC is transiently transmitted using the superconducting cable subjected to the $\rho$ grading before shifting to the DC transmission. This situation may occur when, for example, a cable of a portion of a transmission line was replaced with the superconducting cable subjected to the $\rho$ grading but the other portions are still a cable for the AC transmission, or when the cable for the AC transmission of the transmission line was replaced with the superconducting cable subjected to the $\rho$ grading but a transmission apparatus connected to the cable is still an apparatus for the AC. In this situation, the AC transmission is transiently performed with the superconducting cable subjected to the $\rho$ grading, and then the system is finally shifted to the DC transmission. Therefore, the superconducting cable utilized for both of the DC and AC transmission is preferably designed not only to have the good DC characteristics but also with AC characteristics taken into consideration. When the AC characteristics are also taken into consideration, the superconducting cable having a good impulse characteristic such as a surge can be constructed by constructing the electrical insulation layer to have permittivity $\epsilon$ increased toward the inner periphery side and decreased toward the outer periphery side. Then, when a transient period as described above is ended and the DC transmission is performed, the superconducting cable subjected to the $\rho$ grading used in the transient period can be continuously utilized as a DC cable. That is, the line using the superconducting cable subjected to the $\epsilon$ grading in addition to the $\rho$ grading can be suitably utilized for each of the DC transmission and the AC transmission, and can also be suitably utilized as a line for both of AC and DC transmission.

PPLP (trademark) described above generally has a higher $\rho$ value and a lower $\epsilon$ value as ratio k is increased. Therefore, $\rho$ can be increased toward the outer periphery side and, concurrently, $\epsilon$ can be decreased toward the outer periphery side when the electrical insulation layer is constructed using PPLP (trademark) having ratio k increased toward the outer periphery side of the electrical insulation layer.

On the other hand, kraft paper generally has a higher $\rho$ value and a higher $\epsilon$ value as airtightness is increased. Therefore, it is difficult to construct the electrical insulation layer having $\rho$ increased toward the outer periphery side and $\epsilon$ decreased toward the outer periphery side only with kraft paper. Therefore, the electrical insulation layer is suitably constructed using kraft paper in combination with composite paper. As an example, a kraft paper layer may be formed on the inner periphery side of the electrical insulation layer and a PPLP layer may be formed on the outside thereof to make resistivity $\rho$ lower in the kraft paper layer than in the PPLP layer and permittivity $\epsilon$ higher in the kraft paper layer than in the PPLP layer.

The external superconducting layer is provided on the outer periphery of the electrical insulation layer described above. The external superconducting layer is formed with a superconducting material, as for the superconducting conductor layer. The superconducting material similar to that utilized to form the superconducting conductor layer may be used in the external superconducting layer. When the superconducting cable line of the present invention is utilized for the DC transmission, the external superconducting layer may be utilized as, for example, a return conductor in monopolar transmission or a neutral conductor layer in bipolar transmission. In particular, when the bipolar transmission is performed, the external superconducting layer may be utilized to pass an unbalanced current when an unbalance occurs between a positive electrode and a negative electrode. In addition, when one electrode is in an abnormal state and the bipolar transmission is changed to the monopolar transmission, the external superconducting layer may be utilized as a return conductor for passing a current equivalent to a transmitted current flowing through the superconducting conductor layer. When the superconducting cable line of the present invention is utilized for the AC transmission, the external superconducting layer may be utilized as a shield layer passing a shield current induced by a current flowing through the superconducting conductor layer. A protection layer also for insulation may be provided on an outer periphery of the external superconducting layer.

The heat insulation pipe for a cable for housing the cable core having a construction as described above may have a double pipe structure formed with an external pipe and an internal pipe, which includes a heat insulating material between the pipes and evacuation is performed to attain a prescribed degree of vacuum to form a vacuum insulation construction. Space inside the internal pipe is utilized as a refrigerant passage circulating a refrigerant such as liquid nitrogen which fills the passage for cooling the cable core (especially, the superconducting conductor layer and the external superconducting layer). The heat insulation pipe for a cable as such is preferably a flexible corrugated pipe. In particular, the heat insulation pipe for a cable is preferably formed by a metal material such as stainless having high strength.

The present invention has a construction in which the superconducting cable having the heat insulation pipe for a cable as described above is housed in a heat insulation pipe used to transport a fluid having a temperature lower than an ordinary temperature (hereafter referred to as a heat insulation pipe for a fluid). With this construction, the superconducting cable housed in the heat insulation pipe for a fluid has an outer periphery in a low temperature environment having a temperature lower than the ordinary temperature due to the fluid having a temperature lower than the ordinary temperature. In addition, the superconducting cable can include a double heat insulation structure formed with a heat insulation structure of the heat insulation pipe for a fluid and a heat insulation structure of the cable itself. Therefore, heat intrusion from the outside can be effectively reduced as compared to a conventional cable and energy for cooling the refrigerant filling the superconducting cable can be decreased.

A heat insulation pipe having heat insulation performance corresponding to a fluid transported therein may be utilized as the heat insulation pipe for a fluid housing the superconducting cable. As an example, a heat insulation pipe having a construction similar to that for the superconducting cable may be utilized, that is, a construction having a double pipe structure formed with an external pipe and an internal pipe, which includes a keeping cool material arranged between the pipes. In this situation, space inside the internal pipe becomes a transportation passage for the fluid. In addition, the fluid has a temperature lower than the ordinary temperature. As described above, the refrigerant for cooling the superconducting portion is circulated in the heat insulation pipe for a cable in the superconducting cable. Liquid nitrogen cooled to 77 K, for example, is utilized as the refrigerant. Therefore, when the superconducting cable is laid in an atmosphere, a temperature difference between the inside and outside of the heat insulation pipe for a cable (a temperature difference between the refrigerant and the atmosphere) becomes at least 200 K, and thus heat intrusion into the cable tends to increase. Therefore, in a conventional cable, energy for cooling the refrigerant should be increased or heat insulation performance of the heat insulation pipe for a cable should be increased to reduce the heat intrusion. In contrast, in the superconducting cable housed in the heat insulation pipe for a fluid for transporting a fluid of a low temperature such as a temperature lower than the ordinary temperature, the temperature difference between the inside and outside of the heat insulation pipe for a cable, more specifically, a temperature difference between the refrigerant and the fluid can be made smaller than 200 K. Therefore, heat intrusion becomes smaller as compared to the cable laid in the atmosphere, and energy for cooling the refrigerant can be reduced. That is, when a cooling system for the refrigerant is also taken into consideration, the superconducting cable line of the present invention can increase a coefficient of performance as compared to a conventional line. In particular, reduction of the heat intrusion is extremely effective for increasing the coefficient of performance when the line of the present invention is used as a line for DC transmission in which heat (a conductor loss) is hardly generated with passage of a current, since the heat intrusion becomes a main cause of an energy loss in this situation. In addition, since the superconducting cable housed in the heat insulation pipe for a fluid in the present invention can reduce the heat intrusion as described above, a heat insulation structure of the heat insulation pipe for a cable can be simplified, that is, a level of heat insulation for the heat intrusion can be made lower.

A temperature of the fluid as such should be lower than the ordinary temperature, and a lower temperature is especially preferred because heat intrusion into the cable can be decreased. The fluid utilized may be the same as or different from the refrigerant of the superconducting cable. That is, the fluid may have a temperature substantially equal to, higher than, or lower than a temperature of the refrigerant of the superconducting cable. When the fluid has a temperature similar to that of the refrigerant of the superconducting cable, the temperature difference between the inside and the outside of the heat insulation pipe for a cable can further be decreased.

When the fluid has a temperature lower than that of the refrigerant of the superconducting cable, since there is substantially no heat intrusion from the fluid into the cable, a temperature of the refrigerant substantially does not increase with heat intrusion and, on the contrary, the refrigerant inside the heat insulation pipe for a cable is cooled. Therefore, in the superconducting cable housed in the heat insulation pipe for a fluid transporting the fluid as such, a level of cooling performance of a cooling system for the refrigerant used in the cable can be made relatively low and energy for cooling the refrigerant can be significantly reduced. When the fluid has a temperature higher than that of the refrigerant of the superconducting cable, though a temperature of the refrigerant may be risen with heat intrusion from the fluid into the cable, the heat intrusion is extremely small as compared to a situation of laying in an atmosphere, and therefore a degree of a temperature rise is also extremely low. Therefore, a level of cooling performance of the cooling system for the refrigerant used in the superconducting cable can also be made low in this situation, as compared to the situation of laying in an atmosphere. Specific examples of the fluid include liquid helium (about 4 K), liquid hydrogen (about 20 K), liquid oxygen (about 90 K), liquid nitrogen (about 77 K) and a liquefied natural gas (about 113 K).

When the heat insulation pipe for a fluid is formed by welding a metal plate made of stainless, steel or the like, for example, the superconducting cable may be housed in the heat insulation pipe for a fluid by arranging the cable on the plate, bending the plate to cover the cable, and welding edges of the plate. When a metal tube made of stainless, steel or the like is used as the heat insulation pipe for a fluid, the cable can be housed in the heat insulation pipe for a fluid by inserting the superconducting cable into the tube. In this situation, a skid wire (a slide wire) may be spirally wound around the cable to improve an insertion property of the superconducting cable. In particular, when the heat insulation pipe for a cable is a corrugated pipe having projections and depressions, the insertion property is improved by winding the skid wire with a pitch larger than that of the projections and depressions of the corrugated pipe (a long pitch) to prevent the skid wire from entering a depressed portion of the corrugated pipe to locate the skid wire over the projections and depressions to prevent an outer periphery of the corrugated pipe from directly contacting the heat insulation pipe for a fluid, that is, to achieve point contact between the skid wire wound around the corrugated pipe and the heat insulation pipe for a fluid. Furthermore, a tension member or the like may be attached to the superconducting cable to draw into the heat insulation pipe for a fluid.

The superconducting cable housed in the heat insulation pipe for a fluid may be arranged to contact the fluid transported inside the heat insulation pipe for a fluid or not to contact the fluid. In the former situation, the superconducting cable may be immersed in the fluid. In this situation, since a whole periphery of the superconducting cable contacts the fluid of a low temperature, heat intrusion from the outside into the cable can be effectively reduced.

When the superconducting cable is immersed in the fluid, on the other hand, a problem such as an explosion may arise depending on the fluid in case the superconducting cable is short-circuited, for example, to generate a spark. Therefore, a region inside the heat insulation pipe for a fluid may be divided into a transportation region for the fluid and a region for arranging the superconducting cable therein. As the transportation region for the fluid, for example, a transportation pipe for the fluid may be separately arranged inside the heat insulation pipe for a fluid, and the superconducting cable may be arranged longitudinally along the transportation pipe. In this situation, when a heat exchanger spacer having high heat conductivity is arranged in space inside the heat insulation pipe for a fluid not occupied by the transportation pipe and the superconducting cable, that is, in space enclosed with an inner periphery of the heat insulation pipe for a fluid, an outer periphery of the transportation pipe and an outer periphery of the cable, heat from the fluid can be efficiently conducted to the cable via the heat exchanger spacer, and therefore the cable can be cooled with the fluid especially when the fluid has a temperature lower than that of the refrigerant of the cable. The heat exchanger spacer as such may be formed with, for example, a material having high heat conductivity such as aluminum. More specifically, the heat exchanger spacer may be formed by winding aluminum foil.

In the superconducting cable line of the present invention, a whole length in a longitudinal direction of the superconducting cable forming the line may be housed in the heat insulation pipe for a fluid, or only a portion of the cable may be housed in the heat insulation pipe for a fluid. As an example, the line may have only a portion of the superconducting cable housed in the heat insulation pipe for a fluid and the other portion of the superconducting cable may be laid in the atmosphere. Alternatively, the line may have a low temperature region portion wherein an outer periphery of the cable is in a low temperature environment having a temperature of at most a temperature of the refrigerant and a high temperature region portion in a temperature environment having a temperature higher than the temperature of the refrigerant. In particular, when the fluid has a temperature lower than that of the refrigerant, the portion of the superconducting cable housed in the heat insulation pipe for a fluid may be excessively cooled. With excessive cooling as such, solidification of a portion of the refrigerant may occur, which may inhibit a circulation of the refrigerant of the cable. Therefore, it is desirable to rise a temperature of a portion of the superconducting cable cooled with the fluid in a temperature range capable of maintaining a superconducting state to suppress excessive cooling of the superconducting cable with the fluid to prevent the portion of the refrigerant of the cable having the lowest temperature from reaching a temperature of solidification and inhibiting the circulation of the refrigerant. Thus, it is proposed to provide regions having different temperatures outside the superconducting cable in a longitudinal direction of the superconducting cable line to maintain a heat balance as a whole line. More specifically, it is proposed to provide the low temperature region portion and the high temperature region portion in the superconducting cable line to rise in the high temperature region portion a temperature of the refrigerant of the superconducting cable excessively cooled in the low temperature region portion, or to cool in the low temperature region portion the refrigerant of the superconducting cable having the temperature risen in the high temperature region portion.

The heat insulation pipe for a fluid includes a first heat insulation pipe and a second heat insulation pipe. The low temperature region portion may be constructed by housing the superconducting cable in the heat insulation pipe for a fluid (the first heat insulation pipe) which transports a fluid having a temperature lower than that of the refrigerant filling the heat insulation pipe for a cable. The high temperature region portion may be constructed by laying the superconducting cable in the atmosphere, or by housing the cable in another heat insulation pipe for a fluid (the second heat insulation pipe) which transports a fluid having a temperature higher than that of the refrigerant filling the heat insulation pipe for a cable. When liquid nitrogen is used as the refrigerant of the superconducting cable, for example, liquid hydrogen or liquid helium may be used as the fluid for the low temperature region portion (a first fluid), and a liquefied natural gas or liquid oxygen may be used as the fluid for the high temperature region portion (a second fluid).

In the line of the present invention including the low temperature region portion and the high temperature region portion, a heat balance can be maintained by utilizing a plurality of heat insulation pipes for fluids for transporting fluids having various temperatures, or by combining a construction of housing the cable in the heat insulation pipe for a fluid for transporting the fluid having a temperature lower than that of the refrigerant of the superconducting cable and a construction of laying in the atmosphere. When the low temperature region portions and the high temperature region portions are alternately included in a longitudinal direction of the line, for example, a difference between a decreased temperature in the low temperature region portion and an increased temperature in the high temperature region portion can be decreased. Alternatively, the heat balance of the whole line may be maintained by varying heat insulation performance of the superconducting cable forming the line. That is, in the line of the present invention, heat insulation performance of the heat insulation pipe for a cable may be varied according to a temperature state of a region in which the superconducting cable is arranged. As an example, heat insulation performance of the heat insulation pipe for a cable of the superconducting cable arranged in the high temperature region portion may be made lower than that of the heat insulation pipe for a cable of the cable arranged in the low temperature region portion. In a conventional superconducting cable line laid in the atmosphere, since a temperature range outside a whole length and a whole periphery of the cable is an ordinary temperature, heat insulation performance along the whole length and whole periphery should be set to a constant level, in particular, to a high level to prevent heat intrusion from the outside. In the line of the present invention, however, since heat intrusion into the cable is reduced by including a portion of the superconducting cable housed in the heat insulation pipe for a fluid, the heat insulation performance can be varied as appropriate according to an environment in which the cable is laid. Therefore, when the line includes, for example, a cable portion housed in the heat insulation pipe for a fluid for transporting the fluid having a temperature higher than that of the refrigerant of the superconducting cable and a cable portion laid in the atmosphere, a level of heat insulation performance of the cable portion housed in the heat insulation pipe for a fluid may be made lower than that of the cable portion laid in the atmosphere. This is because, the superconducting cable housed in the heat insulation pipe for a fluid has small heat intrusion from the outside, as described above. Therefore, in the present invention, heat insulation performance of the superconducting cable forming the line can be partially varied. When the heat insulation pipe for a cable has a double pipe structure formed with an external pipe and an internal pipe, in which a heat insulating material is arranged between the pipes and evacuation is performed, heat insulation performance may be varied by, for example, varying a degree of vacuum between the external pipe and the internal pipe, varying a number of winding of the heat insulating material arranged between the external pipe and the internal pipe, or varying a material of the heat insulating material. With maintaining a heat balance as such, thermal energy processed by the refrigerant in the whole line can be further decreased.

In addition, when the superconducting cable line includes a construction for exchanging heat between the refrigerant of the superconducting cable and the fluid for cooling the refrigerant, that is, when the superconducting cable line has a construction additionally including heat exchange means for exchanging heat between the refrigerant of the cable and the fluid, efficiency of a heat exchange can be increased. A refrigerant of a superconducting cable is generally cooled with a cooling system utilizing a heat pump and, in the conventional superconducting cable line, water or an atmosphere of an ordinary temperature is used as an object of condensation of the heat pump. As a result, a temperature difference between objects of a heat exchange becomes at least 200 K. When the refrigerant is cooled to a temperature capable of maintaining a superconducting state, more thermal energy is required as the temperature difference is increased, and a COP becomes at most 0.1. In contrast, when the fluid having a temperature lower than the ordinary temperature is used as the object of the heat exchange with the refrigerant, the temperature difference between objects of the heat exchange becomes smaller as compared to the conventional line using the atmosphere or water of the ordinary temperature, and therefore extremely high heat exchange efficiency is obtained and the COP can become at least 0.5. Particularly when the fluid having a temperature lower than that of the refrigerant of the superconducting cable is used as the object of the heat exchange with the refrigerant of the cable, more specifically, when the refrigerant is directly cooled with the fluid, a refrigerator for the refrigerant of the cable may not be required.

As described above, exchange efficiency can be increased by using the fluid transported through the heat insulation pipe for a fluid as the object of the heat exchange with the refrigerant of the superconducting cable in place of the atmosphere or water of the ordinary temperature. In addition, energy for cooling the refrigerant can further be reduced utilizing latent heat of vaporization of the fluid. When a liquefied natural gas is used as the fluid, for example, latent heat (cold heat) of vaporization of the liquefied natural gas may be utilized. In a plant (a base) of the liquefied natural gas, the liquefied natural gas is vaporized to produce a natural gas. Therefore, when heat is exchanged between the refrigerant of the superconducting cable and the liquefied natural gas, the refrigerant of the cable is cooled by receiving the latent heat of vaporization from the liquefied natural gas, and the liquefied natural gas is heated and vaporized by receiving heat from the refrigerant of the cable. Thus, requirements of both objects can be met without waste.

Energy efficiency can further be increased when a construction of the heat exchange between the fluid and the refrigerant is also provided for a refrigerant of a superconducting apparatus other than the superconducting cable which utilizes a refrigerant of a low temperature, for example, a superconducting transformer, a superconducting magnet energy storage (SMES), or a superconducting current limiter.

Advantages of the superconducting cable can be fully used when the superconducting cable line of the present invention as described above is constructed in a place in which a heat insulation pipe for a fluid for transporting a fluid is arranged, for example, in a fluid plant to utilize the superconducting cable to supply power to various power apparatuses used to transport the fluid.

As described above, the superconducting cable line of the present invention can be utilized for either of the DC transmission and the AC transmission. When three-phase AC transmission is performed, for example, the cable may be formed as a three-core superconducting cable, in which the superconducting conductor layer of each core is utilized for transmission of each phase and the external superconducting layer of each core is utilized as a shield layer. When single-phase AC transmission is performed, the cable may be formed as a single-core superconducting cable, in which the superconducting conductor layer included in the core is utilized for transmission of the phase and the external superconducting layer is utilized as a shield layer. When monopolar DC transmission is performed, the cable may be formed as a single-core superconducting cable, in which the superconducting conductor layer of the core is utilized as a go conductor and the external superconducting layer is utilized as a return conductor. When bipolar DC transmission is performed, the cable may be formed as a two-core superconducting cable, in which the superconducting conductor layer of one core is utilized for positive electrode transmission, the superconducting conductor layer of the other core is utilized for negative electrode transmission, and the external superconducting layer of each core is utilized as a neutral conductor layer.

In addition, the superconducting cable line of the present invention can also be utilized as a line for both of the DC and AC transmission by utilizing the superconducting cable including the cable core having the electrical insulation layer subjected to $\rho$ grading and $\epsilon$ grading as described above. In this situation, not only the superconducting cable but also a terminal structure formed in an end portion of the line for connecting the superconducting cable with a conductive portion on a side of an ordinary temperature (a normal-conducting cable, a lead connected to the normal-conducting cable or the like) is preferably constructed to be suitable for both of the DC and AC transmission. A representative construction of the terminal structure includes an end portion of the cable core extending from an end portion of the superconducting cable, an extraction conductor portion connected to the conductive portion on an ordinary temperature side, a connection portion electrically connecting the end portion of the core with the extraction conductor portion, and an end connection box housing the end portion of the core, an end portion of the extraction conductor portion on a side connected to the core, and the connection portion. The end connection box generally includes a refrigerant bath cooling the end portion of the core or the end portion of the extraction conductor portion, and a vacuum insulation bath arranged on an outer periphery of the refrigerant bath. In the terminal structure as such, a cross-sectional area of a conductor of the extraction conductor portion is desirably variable because an amount of a current flowing through the extraction conductor portion may be different in the AC transmission and the DC transmission. Therefore, a suitable construction of the terminal structure for both of the AC and DC transmission has a cross-sectional area of the conductor of the extraction conductor portion variable according to a load. The terminal structure as such may have a construction, for example, in which the extraction conductor portion is divided into a low temperature-side conductor portion connected to the end portion of the core and an ordinary temperature-side conductor portion arranged on a side of the conductive portion on the ordinary temperature side, which low temperature-side conductor portion and ordinary temperature-side conductor portion are removable from each other. Furthermore, a plurality of removable extraction conductor portions as such are included to allow the cross-sectional area of the conductor of a whole extraction conductor portion to vary according to a number of connections between the low temperature-side conductor portions and the ordinary temperature-side conductor portions. A cross-sectional area of the conductor of each extraction conductor portion may be the same or different from each other. The superconducting cable line of the present invention including the terminal structure as such can readily change from the DC transmission to the AC transmission, or from the AC transmission to the DC transmission, by performing attachment or removal of the extraction conductor portion. In addition, since the cross-sectional area of the conductor of the extraction conductor portion can be varied as described above, the cross-sectional area of the conductor can also be varied as appropriate when an amount of supplied power is varied during the AC transmission or the DC transmission.

Effects of the Invention

A superconducting cable line according to the present invention having a construction as described above can obtain a substantial effect of effectively reducing heat intrusion into a cable and increasing a coefficient of performance. In particular, in a superconducting cable line of the present invention including a low temperature region portion and a high temperature region portion, a heat balance of a whole line can be maintained and energy for cooling a refrigerant of the cable can be reduced.

When a superconducting cable including a cable core having an electrical insulation layer subjected to $\rho$ grading is utilized in the line of the present invention, the line can have a good DC withstand voltage property and can be suitable for DC transmission. In addition, when a superconducting cable including a cable core having an electrical insulation layer subjected to $\rho$ grading and provided to have a higher $\epsilon$ value in a portion near a superconducting conductor layer is utilized in the line of the present invention, an Imp. withstand voltage property can also be increased in addition to an increase in the DC withstand voltage property as described above. In particular, the line of the present invention can also have good AC electric characteristics when the electrical insulation layer is formed to have an $\epsilon$ value increased toward an inner periphery side and decreased toward an outer periphery side. Therefore, the superconducting cable line of the present invention can be suitably utilized for each of DC transmission and AC transmission. In addition, when the superconducting cable including the cable core having the electrical insulation layer subjected to $\rho$ grading and $\epsilon$ grading is utilized as the line of the present invention and a terminal structure formed in an end portion of the line has a construction having a variable cross-sectional area of a conductor of an extraction conductor portion arranged between the superconducting cable and a conductive portion on an ordinary temperature side, the line of the present invention can be suitably utilized in a transient period in which a transmission system is changed from an AC system to a DC system.

DESCRIPTION OF THE REFERENCE SIGNS

1: fluid, 2, 2M, 2N: heat insulation pipe for a fluid, 2a: external pipe, 2b: internal pipe, 3: transportation pipe, 4: heat exchanger spacer, 5: temperature adjustment means, 10: superconducting cable, 10a: pipeline, 11: heat insulation pipe for a cable, 11a: external pipe, 11b: internal pipe, 12: cable core, 13: space, 14: superconducting conductor layer, 15: external superconducting layer, 20, 30: heat exchange means, 21, 31: passage, 22: expansion valve, 23: compressor, 24, 32: heat insulation case, 25: pipeline, 40: extraction conductor portion, 41: low temperature-side conductor portion, 41a: low temperature-side seal portion, 42: ordinary temperature-side conductor portion, 42a: ordinary temperature-side seal portion, 43: lead, 44: ground line, 50: end connection box, 51, 52: refrigerant bath, 53: vacuum insulation bath, 53a: extensible portion, 60: bushing, 61: extraction conductor portion, 62: hollow porcelain, 63: epoxy unit, 70: short-circuited portion, 100: superconducting cable for three-phase AC transmission, 101: heat insulation pipe, 101a: external pipe, 101b: internal pipe, 102: cable core, 103: space, 104: corrosion-proof layer, 200: former, 201: superconducting conductor layer, 202: electrical insulation layer, 203: superconducting shield layer, 204: protection layer.

BEST MODES FOR CARRYING OUT THE INVENTION

Embodiments of the present invention will now be described.

Example 1

Figure 1:
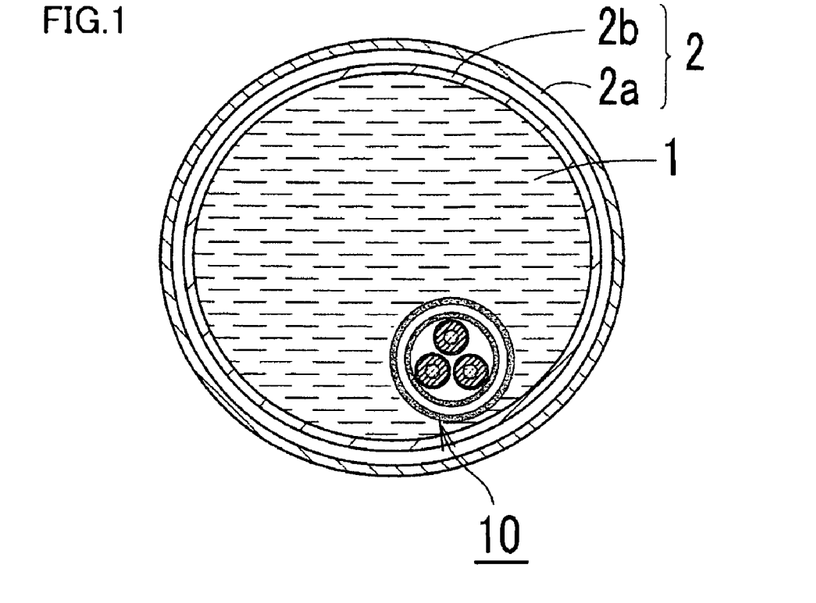
FIG. 1 is a schematic cross-sectional view of a construction of a superconducting cable line of the present invention.
Figure 2:
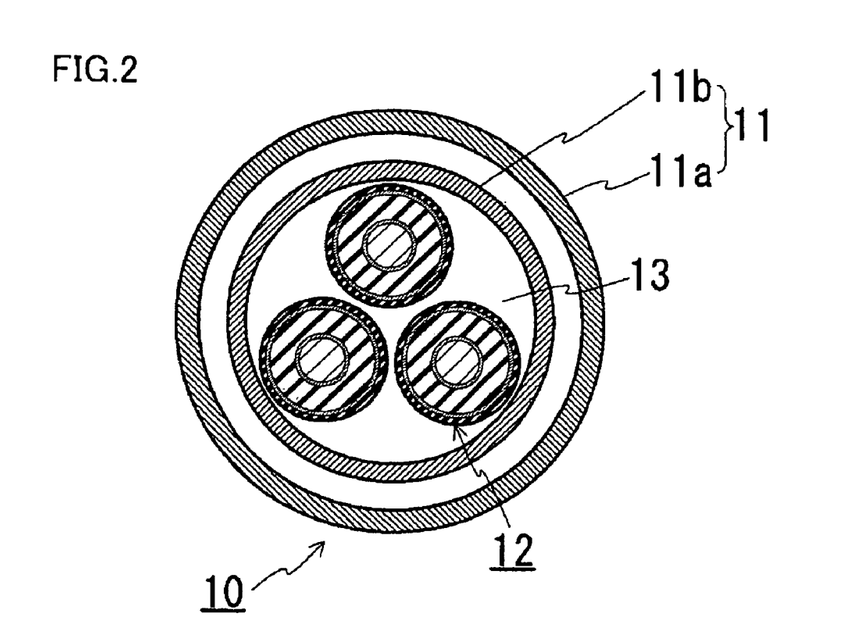
FIG. 2 is a schematic cross-sectional view of a construction of a portion near a superconducting cable in the superconducting cable line of the present invention.
Figure 3:
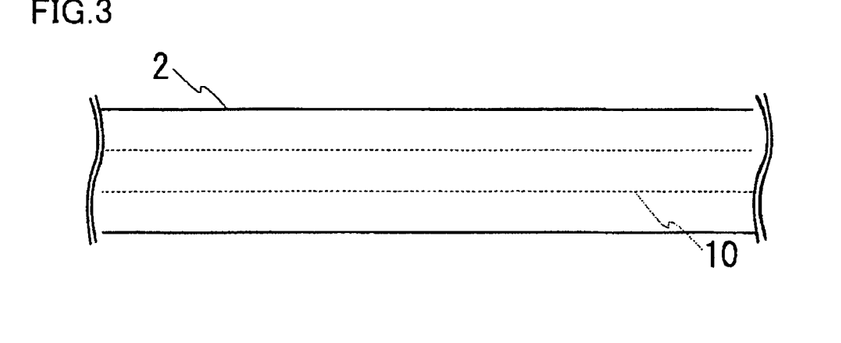
FIG. 3 is a schematic front view of a construction of the superconducting cable line of the present invention.

FIG. 1 is a schematic cross-sectional view of a construction of a superconducting cable line of the present invention. FIG. 2 is a schematic cross-sectional view of a construction of a portion near a superconducting cable in the superconducting cable line of the present invention. FIG. 3 is a schematic front view of a construction of the superconducting cable line of the present invention. The same characters in the drawings indicate the same portions. The superconducting cable line of the present invention includes a heat insulation pipe for a fluid 2 for transporting a fluid 1 having a temperature lower than an ordinary temperature, and a superconducting cable 10 housed in heat insulation pipe for a fluid 2.

Superconducting cable 10 utilized in this example has a construction in which three cable cores 12 are stranded and housed in a heat insulation pipe for a cable 11, which construction is basically similar to that of a superconducting cable shown in FIG. 11. Each cable core 12 includes, from a center portion thereof, a former, a superconducting conductor layer, an electrical insulation layer, an external superconducting layer, and a protection layer. Each of the superconducting conductor layer and the external superconducting layer was formed with a Bi2223-based superconducting tape line (an Ag—Mn sheath line). The superconducting conductor layer and the external superconducting layer were formed by spirally winding the superconducting tape line on an outer periphery of the former and on an outer periphery of the electrical insulation layer, respectively. A plurality of stranded copper lines were used as the former. A cushion layer was formed between the former and the superconducting conductor layer with insulating paper. The electrical insulation layer was constructed by winding semisynthetic insulating paper (PPLP: a trademark of Sumitomo Electric Industries, Ltd.) on an outer periphery of the superconducting conductor layer. An internal semi-conducting layer and an external semi-conducting layer may be respectively provided on an inner periphery side and an outer periphery side (below the external superconducting layer) of the electrical insulation layer. The protection layer was provided by winding kraft paper on an outer periphery of the external superconducting layer. Three cable cores 12 as such are prepared, stranded with slack to have an allowance for thermal contraction, and housed in heat insulation pipe 11. In this example, an SUS corrugated pipe was used to form heat insulation pipe 11, in which a heat insulating material (not shown) having a multi-layer structure was arranged between a double pipe formed with an external pipe 11a and an internal pipe 11b, and air between external pipe 11a and internal pipe 11b was evacuated to attain a prescribed degree of vacuum to form a vacuum multilayer insulation construction. Space 13 enclosed with an inner periphery of internal pipe 11b and outer peripheries of three cable cores 12 becomes a passage of a refrigerant. The refrigerant for cooling the superconducting conductor layer and the external superconducting layer is circulated in this passage using a pump or the like. In this example, liquid nitrogen (about 77 K) was utilized as the refrigerant.

Superconducting cable 10 having a construction as described above is housed in heat insulation pipe for a fluid 2. Heat insulation pipe for a fluid 2 in this example has a construction of a double pipe structure formed with an external pipe 2a and an internal pipe 2b, which has a keeping cool material (not shown) arranged between pipes 2a, 2b. Space enclosed with an inner periphery of internal pipe 2b and an outer periphery of superconducting cable 10 becomes a transportation passage for fluid 1. Each of pipes 2a, 2b was a welded pipe made of steel, and cable 10 was housed in internal pipe 2b by arranging superconducting cable 10 on a steel plate for forming internal pipe 2b and welding both edges of the steel plate. In this example, superconducting cable 10 is arranged in internal pipe 2b while being immersed in the fluid. In this example, a liquefied natural gas (about 111 K) was utilized as the fluid.

In the superconducting cable line of the present invention including a construction as described above, since the superconducting cable is housed in the heat insulation pipe for a fluid for transporting the fluid having a temperature lower than an ordinary temperature, a difference between a temperature inside the cable and a temperature of an environment around an outer periphery of the cable can be made less than 200 K. Therefore, the line of the present invention can reduce heat intrusion from an environment of an ordinary temperature such as an atmosphere as compared to a superconducting cable line laid in the atmosphere. In particular, since the line of the present invention utilizes the heat insulation pipe for a fluid together with the heat insulation pipe of the superconducting cable itself to form a double heat insulation structure, heat intrusion into the cable from the outside or the like can be reduced more effectively. Therefore, the superconducting cable line of the present invention can reduce energy for cooling the refrigerant of the superconducting cable, and can substantially increase a coefficient of performance of a whole line.

Example 2

Figure 4:
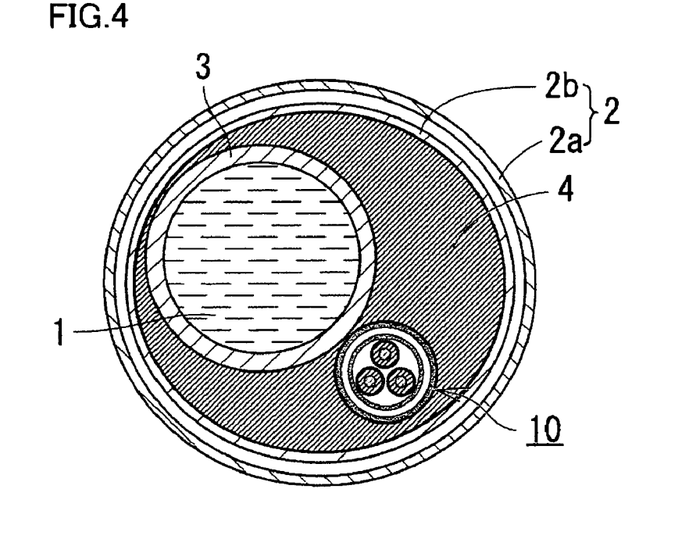
FIG. 4 is a schematic cross-sectional view of the superconducting cable line of the present invention including a transportation pipe for a fluid, the superconducting cable and a heat exchanger spacer inside a heat insulation pipe for a fluid.

Though the superconducting cable was immersed in the fluid in example 1 described above, the superconducting cable may be housed in the heat insulation pipe for a fluid without being immersed in the fluid. As an example, a transportation passage for the fluid may be separately provided in the heat insulation pipe for a fluid. FIG. 4 is a schematic cross-sectional view of the superconducting cable line of the present invention including a transportation pipe for a fluid and a heat exchanger spacer inside the heat insulation pipe for a fluid. This superconducting cable line has a construction including a separate transportation pipe 3 for a fluid in internal pipe 2b of heat insulation pipe for a fluid 2. A heat exchanger spacer 4 having high heat conductivity is arranged in space enclosed with an inner periphery of internal pipe 2b, an outer periphery of transportation pipe 3 and an outer periphery of superconducting cable 10. With this construction, superconducting cable 10 has a double heat insulation structure formed with heat insulation pipe for a fluid 2 and heat insulation pipe 11 of cable 10 itself (see FIGS. 1, 2) as in example 1, and therefore heat intrusion from the outside can be reduced. In addition, since heat from the fluid is conducted to superconducting cable 10 via heat exchanger spacer 4, especially when the fluid is, for example, liquid hydrogen (about 20 K) or liquid helium (about 4 K) having a temperature lower than that of the refrigerant (liquid nitrogen) of cable 10, cable 10 can also be cooled with fluid 1. In addition, since fluid 1 is physically separated from superconducting cable 10 with heat exchanger spacer 4 and transportation pipe 3, a problem such as firing of fluid 1 can be prevented when an accident such as a short circuit of cable 10 occurs and a spark is generated. In this example, the heat exchanger spacer was formed by winding aluminum foil.

Example 3

Figure 5:
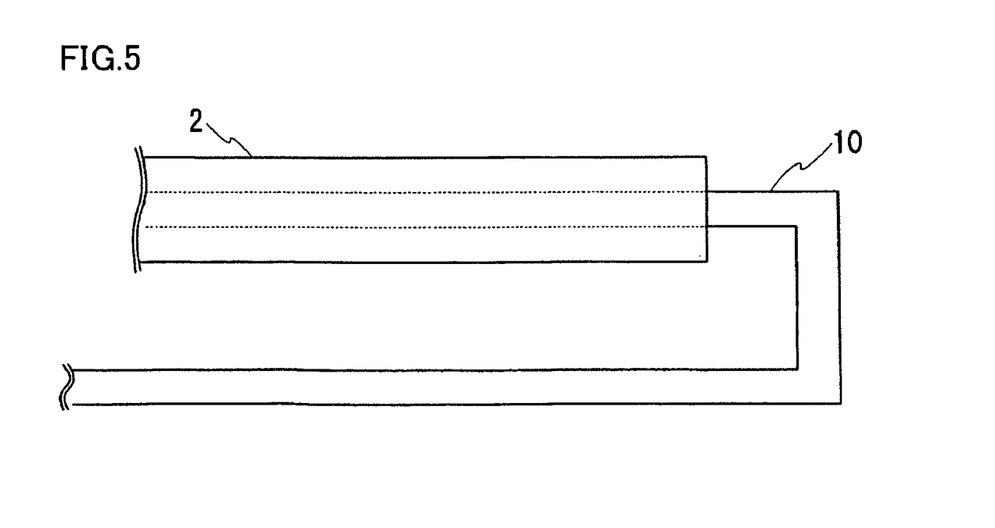
FIG. 5 is a schematic view of a construction of the superconducting cable line of the present invention including a low temperature region portion and a high temperature region portion.

Though the superconducting cable of the whole line was housed in the heat insulation pipe for a fluid in the construction described in example 1, in the line, a portion of the cable may be housed in the heat insulation pipe for a fluid and the other portion of the cable may be laid in the atmosphere. FIG. 5 is a schematic view of a construction of the superconducting cable line of the present invention including a low temperature region portion and a high temperature region portion. This superconducting cable line includes a low temperature region portion in which superconducting cable 10 is housed in heat insulation pipe for a fluid 2 and a high temperature region portion in which cable 10 is laid in the atmosphere without being housed in heat insulation pipe for a fluid 2. In particular, a fluid having a temperature lower than that of the refrigerant of superconducting cable 10, for example, liquid hydrogen is used as the fluid transported in heat insulation pipe for a fluid 2. With this construction, in a portion of the superconducting cable of the line housed in heat insulation pipe for a fluid 2, that is, in the low temperature region portion, since an outer periphery of the cable is arranged in a low temperature environment having a temperature of at most a temperature of the refrigerant and since there is heat insulation pipe for a fluid 2 in addition to the heat insulation pipe of cable 10 itself, heat intrusion into the cable can be reduced. On the other hand, since the outer periphery of the superconducting cable has a temperature lower than that of the refrigerant, the refrigerant may be excessively cooled and solidify, which may inhibit a circulation of the refrigerant. Therefore, as shown in FIG. 5, a portion of the superconducting cable forming the line is laid in the atmosphere without being housed in heat insulation pipe for a fluid 2 to heat the excessively cooled refrigerant with heat intrusion from the atmosphere, which can alleviate excessive cooling of the refrigerant. That is, the line can maintain a heat balance as a whole superconducting cable line. It is to be noted that, the superconducting cable inside the heat insulation pipe for a fluid may be immersed in the fluid as shown in example 1, or a transportation passage for the fluid and the cable may be separately provided as shown in example 2. This point is similarly applied to examples described below.

Example 4

Though the fluid having a temperature lower than that of the refrigerant of superconducting cable 10 was used in example 3 described above, a fluid having a temperature higher than that of the refrigerant, for example, liquid oxygen or a liquefied natural gas may be utilized. In this situation, the superconducting cable housed in heat insulation pipe for a fluid 2 and the superconducting cable laid in the atmosphere may have different heat insulation performance. The superconducting cable housed in heat insulation pipe for a fluid 2 has heat intrusion from the atmosphere smaller than that of the cable laid in the atmosphere. Therefore, heat insulation performance of the superconducting cable housed in heat insulation pipe for a fluid 2 can be made lower than that of the cable laid in the atmosphere. In the superconducting cable line of the present invention, heat insulation performance can be partially varied as described above. Heat insulation performance of the superconducting cable may be varied by varying a degree of vacuum in the heat insulation pipe for a cable for housing the cable core, varying an amount of a heat insulating material arranged in the heat insulation pipe, or varying a material of the heat insulating material.

Example 5

Figure 6:
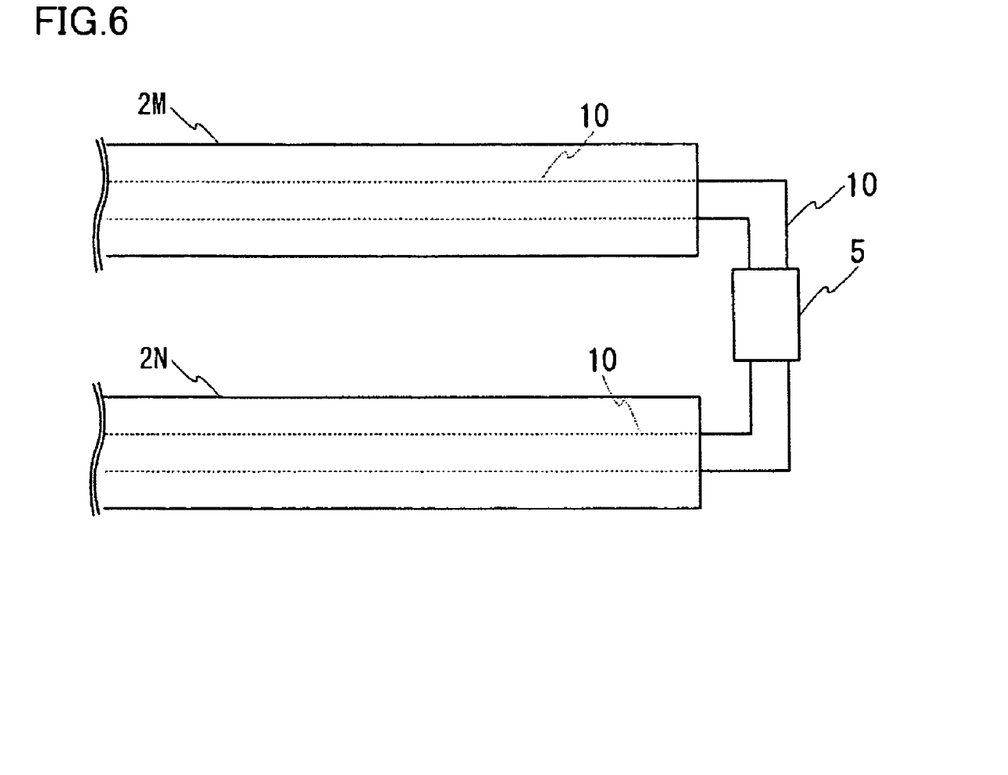
FIG. 6 is a schematic view of a construction of the superconducting cable line of the present invention in which the superconducting cable is housed in each of two heat insulation pipes for fluids for transporting different fluids.

Though a portion of the cable of the line was housed in one heat insulation pipe for a fluid in the construction described in example 3, when there are a plurality of heat insulation pipes for fluids for transporting various fluids, the superconducting cable may be housed in each of the heat insulation pipes for fluids. FIG. 6 is a schematic view of a construction of the superconducting cable line of the present invention in which the superconducting cable is housed in each of two heat insulation pipes for fluids for transporting different fluids. This superconducting cable line includes a heat insulation pipe for a fluid 2M for transporting a fluid (for example, liquid hydrogen) having a temperature lower than the refrigerant (liquid nitrogen) of superconducting cable 10 and a heat insulation pipe for a fluid 2N for transporting a fluid (for example, a liquefied natural gas) having a temperature higher than the refrigerant, and superconducting cable 10 is housed in each of heat insulation pipes 2M, 2N. That is, in this construction, a portion of the superconducting cable of the line housed in heat insulation pipe for a fluid 2M for transporting the fluid of a low temperature becomes a low temperature region portion, and a portion of the cable housed in heat insulation pipe for a fluid 2N for transporting the fluid of a high temperature which is lower than an ordinary temperature becomes a high temperature region portion. With this construction, when the refrigerant of the superconducting cable is excessively cooled in the low temperature region portion, a temperature of the refrigerant is risen with heat from the fluid in the high temperature region portion, and therefore a heat balance of the whole line can be maintained. As shown in FIG. 6, in this example, temperature adjustment means 5 for adjusting a temperature of the refrigerant of superconducting cable 10 is included between the low temperature region portion and the high temperature region portion to perform fine adjustment of the temperature of the refrigerant. Since a temperature difference between the refrigerant of superconducting cable 10 and the fluid (liquid hydrogen) in the low temperature region portion and a temperature difference between the refrigerant and the fluid (a liquefied natural gas) in the high temperature region portion are relatively small in this example, temperature adjustment means 5 having a low adjustment level (a small span of adjustable range for the temperature difference) can be utilized.

Example 6

Figure 7:
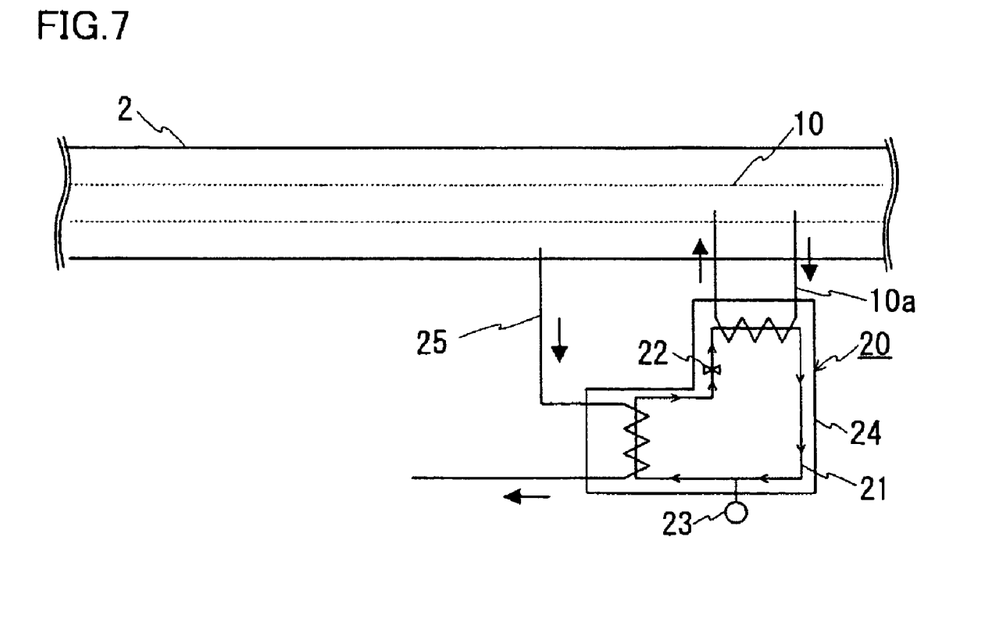
FIG. 7 is a schematic view of a construction of an example of the superconducting cable of the present invention including a cooling system for cooling a refrigerant of the superconducting cable, which includes heat exchange means for exchanging heat between the refrigerant and a fluid.

The line of the present invention can also utilize a fluid as an object of a heat exchange during cooling of the refrigerant of the superconducting cable. FIG. 7 is a schematic view of a construction of the superconducting cable of the present invention including a cooling system for cooling the refrigerant of the superconducting cable, which is an example including heat exchange means for exchanging heat between the refrigerant and a fluid. This superconducting cable line includes heat exchange means 20 for cooling the refrigerant of superconducting cable 10 which utilizes the fluid as an object of a heat exchange. Heat exchange means 20 includes a passage 21 circulating a heat-exchanging medium such as helium, an expansion valve 22 expanding the heat-exchanging medium, a compressor 23 compressing the expanded heat-exchanging medium, and a heat insulation case 24 housing these elements. Then, a pipeline 10a transporting the refrigerant of cable 10 is arranged on a portion of passage 21 which passed through expansion valve 22 so as to cool the refrigerant of superconducting cable 10 with the expanded heat-exchanging medium, and a pipeline 25 transporting the fluid is arranged on a portion of passage 21 which passed through compressor 23 so as to condense and heat the compressed heat-exchanging medium with the fluid.

With a construction described above, the refrigerant of superconducting cable 10 having a temperature risen due to a conductor loss or the like associated with passage of a current is cooled with heat exchange means 20 and returned to cable 10. In this situation, since the fluid having a temperature lower than the ordinary temperature is used as an object of condensation of heat exchange means 20, energy for cooling the refrigerant of cable 10, more specifically, energy such as that for driving expansion valve 22 and compressor 23 can be substantially decreased as compared to a situation in which the atmosphere or water of the ordinary temperature is used as the object. In addition, though the fluid may be heated and vaporized with heat exchange means 20, in a fluid plant, a fluid is vaporized and utilized as appropriate. Therefore, the vaporized fluid may be cooled and liquefied as appropriate with cooling means such as an additionally included refrigerator, or may be directly utilized in a vaporized state. With exchanging of heat between the refrigerant of the superconducting cable and the fluid as described above, energy for cooling the refrigerant can be reduced and the line can further increase a coefficient of performance. In addition, since the line can also cool the refrigerant of the superconducting cable utilizing latent heat of vaporization of the fluid, energy for cooling the refrigerant can further be reduced. Furthermore, since the line can vaporize the fluid concurrently with cooling of the refrigerant of the superconducting cable, energy associated with vaporization of the fluid can also be reduced. A liquefied natural gas is suitably used as such fluid.

Example 7

Figure 8:
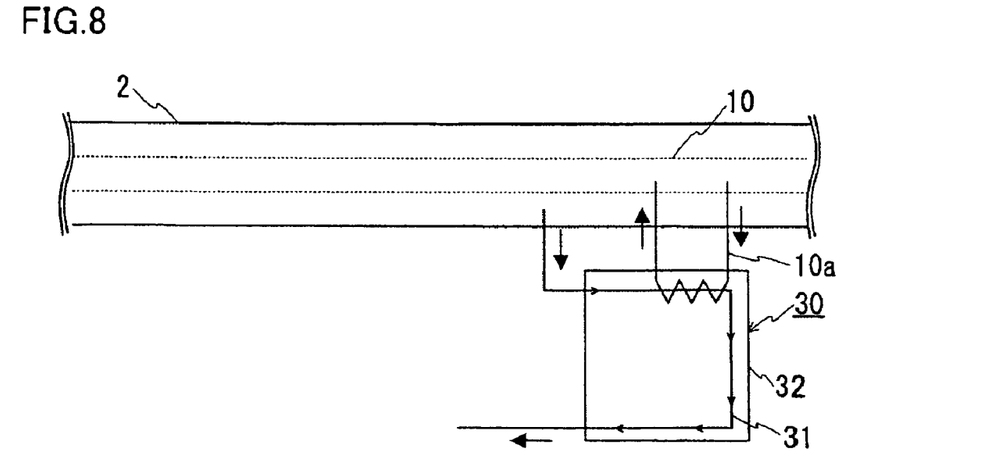
FIG. 8 is a schematic view of a construction of the superconducting cable line of the present invention including heat exchange means for directly cooling the refrigerant of the superconducting cable with a fluid.

When the fluid has a temperature lower than that of the refrigerant of the superconducting cable, the line of the present invention may have a construction in which the refrigerant of the cable is directly cooled with the fluid. FIG. 8 is a schematic view of a construction of the superconducting cable line of the present invention including heat exchange means for directly cooling the refrigerant of the superconducting cable with the fluid. This superconducting cable line includes heat exchange means 30 for cooling the refrigerant of superconducting cable 10 which utilizes the fluid as an object of a heat exchange. Heat exchange means 30 includes a heat insulation case 32 housing a pipeline 10a transporting the refrigerant ejected from cable 10 and allowing the refrigerant to flow into cable 10 again, and a pipeline 31 transporting the fluid ejected from heat insulation pipe for a fluid 2. A transportation pipeline 10a is arranged inside heat insulation case 32 such that transportation pipeline 10a for the refrigerant contacts a transportation pipeline 31 for the fluid. With this construction, the refrigerant of the superconducting cable can be efficiently cooled with a cryogenic fluid. It is to be noted that, a heat exchanger material may be arranged inside heat insulation case 32 to facilitate conduction of heat of the cryogenic fluid to transportation pipeline 10a for the refrigerant. An aluminum material, for example, may be used as the heat exchanger material.

The superconducting cable line of the present invention shown in each of examples 1-7 described above can be utilized for either of DC transmission and AC transmission. In a situation of the DC transmission, when the superconducting cable including the cable core having the electrical insulation layer subjected to $\rho$ grading to have a low resistivity on an inner periphery side and a high resistivity on an outer periphery side is utilized, a DC electric field distribution in a thickness direction of the electrical insulation layer can be smoothed and a DC withstand voltage property can be increased. The resistivity can be varied using PPLP (trademark) having various ratios k. The resistivity tends to increase as ratio k increases. In addition, when a high $\epsilon$ layer is provided in the electrical insulation layer near the superconducting conductor layer, an Imp. withstand voltage property can be increased in addition to an increase in the DC withstand voltage property. The high $\epsilon$ layer may be formed using, for example, PPLP (trademark) having a low ratio k. In this situation, the high $\epsilon$ layer also becomes a low $\rho$ layer. Furthermore, the superconducting cable including the cable core having the electrical insulation layer subjected to the $\rho$ grading and also formed to have permittivity $\epsilon$ increased toward the inner periphery side and decreased toward the outer periphery side also has good AC characteristics. Therefore, the line of the present invention utilizing the cable as such can also be suitably utilized for the AC transmission. As an example, the electrical insulation layer may be provided using PPLP (trademark) having various ratios k as indicated below to have three different resistivities and permittivities. The following three layers may be successively provided from the inner periphery side (X and Y are constants).

Low $\rho$ layer: ratio k=60%, resistivity $\rho$ (20° C.)=•X [$\Omega$·cm], permittivity $\epsilon$=Y Intermediate $\rho$ layer: ratio k=70%, resistivity $\rho$ (20° C.)=about 1.2X [$\Omega$·cm], permittivity $\epsilon$=about 0.95Y High $\rho$ layer: ratio k=80%, resistivity $\rho$ (20° C.)=about 1.4X [$\Omega$·cm], permittivity $\epsilon$=about 0.9Y When monopolar transmission is performed with the line of the present invention using the superconducting cable subjected to the $\rho$ grading and the $\epsilon$ grading, two cores out of three cable cores 12 (see FIG. 2) may be used as auxiliary cores, the superconducting conductor layer of one core may be used as a go conductor and the external superconducting layer of the core may be used as a return conductor. Alternatively, the superconducting conductor layer of each core may be used as the go conductor and the external superconducting layer of each core may be used as the return conductor to construct a three-line monopolar transmission line. On the other hand, when bipolar transmission is performed, one core out of three cores may be used as an auxiliary core, the superconducting conductor layer of one core may be used as a positive electrode line, the superconducting conductor layer of another core may be used as a negative electrode line, and the external superconducting layers of both cores may be used as neutral conductor layers.

Figure 9:
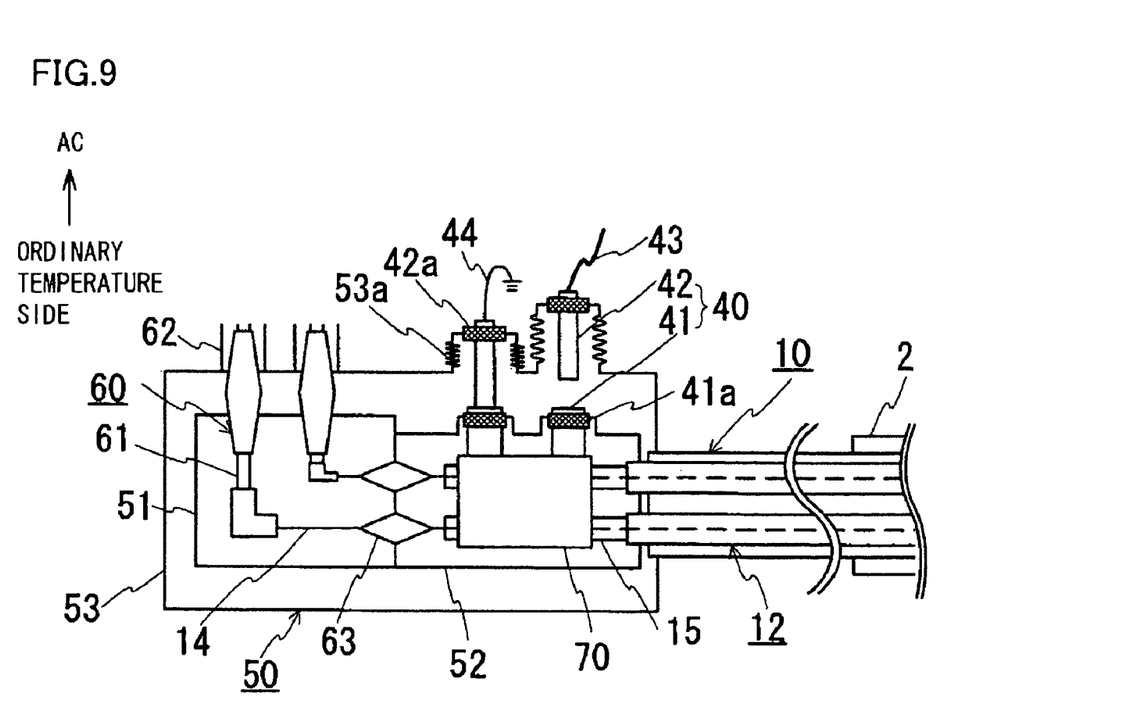
FIG. 9 is a schematic view of a construction of a terminal structure formed in an end portion of the superconducting cable line of the present invention using a three-core type superconducting cable in a situation of an AC transmission line.
Figure 10:
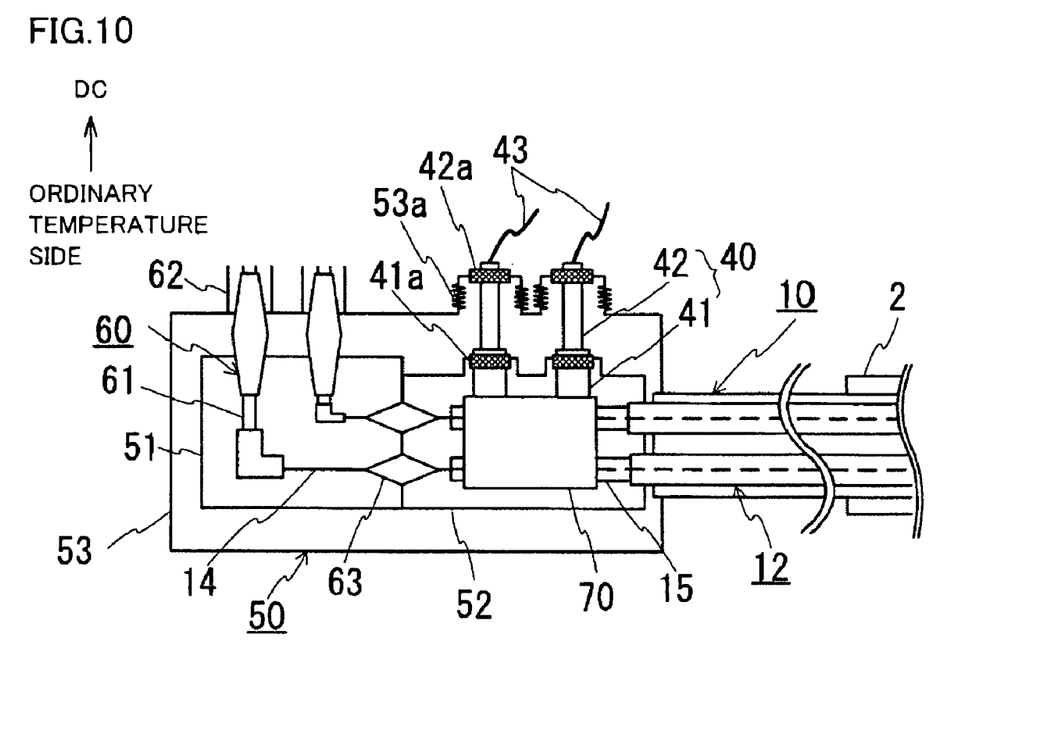
FIG. 10 is a schematic view of a construction of a terminal structure formed in an end portion of the superconducting cable line of the present invention using a three-core type superconducting cable in a situation of a DC transmission line.

The line of the present invention using the superconducting cable subjected to the $\rho$ grading and the $\epsilon$ grading and including a terminal structure as described below can readily perform the DC transmission such as monopolar transmission or bipolar transmission after the AC transmission, or the AC transmission after the DC transmission. Each of FIGS. 9 and 10 is a schematic view of a construction of a terminal structure having a removable extraction conductor portion, which is formed in an end portion of the superconducting cable line of the present invention using a three-core type superconducting cable. FIG. 9 indicates a situation of an AC transmission line, and FIG. 10 indicates a situation of a DC transmission line. Though two cable cores 12 are only shown in each of FIGS. 9 and 10, there actually are three cores.

The terminal structure includes an end portion of cable core 12 extending from an end portion of superconducting cable 10, extraction conductor portions 40, 61 connected to a conductive portion (not shown) on an ordinary temperature side, a connection portion electrically connecting the end portion of core 12 with extraction conductor portions 40, 61, and an end connection box 50 housing the end portion of core 12, end portions of extraction conductor portions 40, 61 on a side connected to the core, and the connection portion. End connection box 50 includes a refrigerant bath 51 filled with a refrigerant for cooling superconducting conductor layer 14, into which superconducting conductor layer 14 exposed by step stripping of the end portion of core 12 is introduced, a refrigerant bath 52 filled with a refrigerant for cooling an external superconducting layer 15, into which external superconducting layer 15 also exposed by step stripping is introduced, and a vacuum insulation bath 53 arranged on outer peripheries of refrigerant baths 51, 52. Extraction conductor portion 61, which is embedded in bushing 60 arranged between the conductive portion on the ordinary temperature side and superconducting conductor layer 14, is connected to superconducting conductor layer 14 via a joint (a connection portion) to allow transmission and reception of power between superconducting cable 10 and the conductive portion on the ordinary temperature side. A side (an ordinary temperature side) of bushing 60 connected to the conductive portion on the ordinary temperature side projects from vacuum insulation bath 53 and is housed in hollow porcelain 62 provided to project from vacuum insulation bath 53.

On the other hand, external superconducting layer 15 is connected via a short-circuited portion 70 (a connection portion) described below to extraction conductor portion 40 arranged between the conductive portion on the ordinary temperature side and external superconducting layer 15 to allow transmission and reception of power between superconducting cable 10 and the conductive portion on the ordinary temperature side. Extraction conductor portion 40 is formed with a low temperature-side conductor portion 41 connected to short-circuited portion 70 and an ordinary temperature-side conductor portion 42 arranged on the ordinary temperature side which is removable from low temperature-side conductor portion 41. In this example, ordinary temperature-side conductor portion 42 is formed in a rod-like shape having a prescribed cross-sectional area, and low temperature-side conductor portion 41, is formed in a cylindrical shape into which the rod-like ordinary temperature-side conductor portion 42 can be fitted. When ordinary temperature-side conductor portion 42 is inserted into low temperature-side conductor portion 41, the portions 41 and 42 are electrically connected to each other to allow transmission and reception of power between the low temperature side and the ordinary temperature side, and the portions 41 and 42 are brought out of conduction when ordinary temperature-side conductor portion 42 is removed from low temperature-side conductor portion 41. A plurality of extraction conductor portions 40 as such are included in the terminal structure. Low temperature-side conductor portion 41 is fixed on refrigerant bath 52 and has one end electrically connected to short-circuited portion 70 and the other end arranged to enter vacuum insulation bath 53. A low temperature-side-seal portion 41a made of FRP is provided on an outer periphery of a fixing portion of low temperature-side conductor portion 41 to avoid leaking of the refrigerant, short-circuiting of refrigerant bath 52 and conductor portion 41, and the like. Ordinary temperature-side conductor portion 42 is fixed on vacuum insulation bath 53 and has one end arranged in vacuum insulation bath 53 and the other end arranged to be exposed to the outside of an ordinary temperature. An ordinary temperature-side seal portion 42a made of FRP is provided on an outer periphery of a fixing portion of ordinary temperature-side conductor portion 42 to allow reduction of heat intrusion and to avoid short-circuiting of vacuum insulation bath 53 and conductor portion 42 and the like. In addition, an extensible portion 53a formed with a corrugated pipe is provided on vacuum insulation bath 53 near the fixing portion of ordinary temperature-side conductor portion 42 to maintain a vacuum state of vacuum insulation bath 53 during attachment and removal of extraction conductor portion 40. It is to be noted that, external superconducting layer 15 of each of three cores 12 is short-circuited in short-circuited portion 70. In addition, a lead 43 connected to an external apparatus or the like, or a ground line 44 is attached to an end portion on the ordinary temperature side of ordinary temperature-side conductor portion 42. An epoxy unit 63 is arranged on an outer periphery of a portion of superconducting conductor layer 14 which is arranged near a portion between refrigerant baths 51, 52.

When the superconducting cable line including the terminal structure having a construction as described above is utilized as, for example, a three-phase AC line, extraction conductor portion 40 connected to external superconducting layer 15 should have a cross-sectional area of the conductor required to obtain a voltage to ground. Therefore, as shown in FIG. 9, while low temperature-side conductor portion 41 and ordinary temperature-side conductor portion 42 of extraction conductor portion 40 needed are connected to each other, low temperature-side conductor portion 41 and ordinary temperature-side conductor portion 42 of extraction conductor portion 40 not needed are separated from each other to obtain a required cross-sectional area of the conductor. In this example, ground line 44 for grounding is connected to the end portion on the ordinary temperature side of ordinary temperature-side conductor portion 42 of extraction conductor portion 40 which is connected.

On the other hand, when a change from the three-phase AC transmission as shown in FIG. 9 to the DC transmission is requested, a current equivalent to that for superconducting conductor layer 14 flows through external superconducting layer 15. That is, the current flowing through external superconducting layer 15 is increased and a current flowing through extraction conductor portion 40 is also increased as compared to those in the situation of the AC transmission shown in FIG. 9. Therefore, as shown in FIG. 10, low temperature-side conductor portion 41 and ordinary temperature-side conductor portion 42 of extraction conductor portion 40 which were separated during the AC transmission are connected to each other to ensure a sufficient cross-sectional area of the conductor for passing a required amount of current. In this example, lead 43 is connected to the end portion on the ordinary temperature side of ordinary temperature-side conductor portion 42 of extraction conductor portion 40 which is connected. Reversely, when a change from the DC transmission as shown in FIG. 10 to the AC transmission is requested, one of extraction conductor portions 40 which was brought into conduction during the DC transmission is separated to bring out of conduction.

INDUSTRIAL APPLICABILITY

A superconducting cable line of the present invention is suitably utilized as a line for supplying power to various power apparatuses or consumers. Advantages of a superconducting cable such as supplying of a large amount of power with a low resistance can be sufficiently used when the line is used as a line for supplying power to a power apparatus inside a fluid plant transporting a fluid having a low temperature below an ordinary temperature. In addition, since the cable line can be constructed during construction of a transportation passage for the fluid, workability for laying is increased.

The invention claimed is:
1. A superconducting cable line comprising:
a heat insulation pipe for a fluid for transporting a fluid having a temperature lower than an ordinary temperature; and
a superconducting cable housed in said heat insulation pipe for a fluid;
said superconducting cable includes a superconducting conductor layer and an electrical insulation layer provided on an outer periphery of said superconducting conductor layer, and
said electrical insulation layer is subjected to $\rho$ grading for attaining a low resistivity on an inner periphery side of said electrical insulation layer and a high resistivity on an outer periphery side to smooth a DC electric field distribution in a diameter direction thereof.

2. The superconducting cable line according to claim 1, wherein said superconducting cable is immersed in said fluid.

3. The superconducting cable line according to claim 1, wherein a region inside said heat insulation pipe for a fluid is divided into a transportation region for transporting said fluid and a region for arranging said superconducting cable therein.

4. The superconducting cable line according to claim 1, wherein said fluid is any of liquid helium, liquid hydrogen, liquid oxygen, liquid nitrogen and a liquefied natural gas.

5. The superconducting cable line according to claim 1, wherein said fluid is different from a refrigerant of said superconducting cable.

6. The superconducting cable line according to claim 1, wherein
said superconducting cable includes a refrigerant for cooling a superconducting portion;
said superconducting cable line has a low temperature region portion wherein an outer periphery of said superconducting cable is in a low temperature environment having a temperature of at most a temperature of said refrigerant and a high temperature region portion wherein an outer periphery of said superconducting cable is in a temperature environment having a temperature higher than the temperature of said refrigerant; and
in said low temperature region portion, said superconducting cable is housed in said heat insulation pipe for a fluid.

7. The superconducting cable line according to claim 6, wherein
said heat insulation pipe for a fluid includes a first heat insulation pipe transporting a first fluid and a second heat insulation pipe transporting a second fluid different from said first fluid;
in the high temperature region portion, said superconducting cable is housed in said second heat insulation pipe; and
the refrigerant of said superconducting cable is liquid nitrogen, said first fluid is liquid hydrogen and said second fluid is a liquefied natural gas.

8. The superconducting cable line according to claim 1, wherein
said superconducting cable includes a refrigerant for cooling a superconducting portion; and
said superconducting cable line comprises heat exchange means for exchanging heat between said refrigerant and said fluid.

9. The superconducting cable line according to claim 1, wherein
said electrical insulation layer has a high $\epsilon$ layer provided near said superconducting conductor layer and having a permittivity higher than that in another portion.

10. The superconducting cable line according to claim 1, wherein
said electrical insulation layer is constructed to have a permittivity $\epsilon$ increased toward the inner periphery side and decreased toward the outer periphery side.

* * * * *